No. 619,873. Patented Feb. 21, 1899.
P. DIEHL & M. HEMLEB.
SEWING MACHINE TRIMMER.
(Application filed Mar. 11, 1898.)

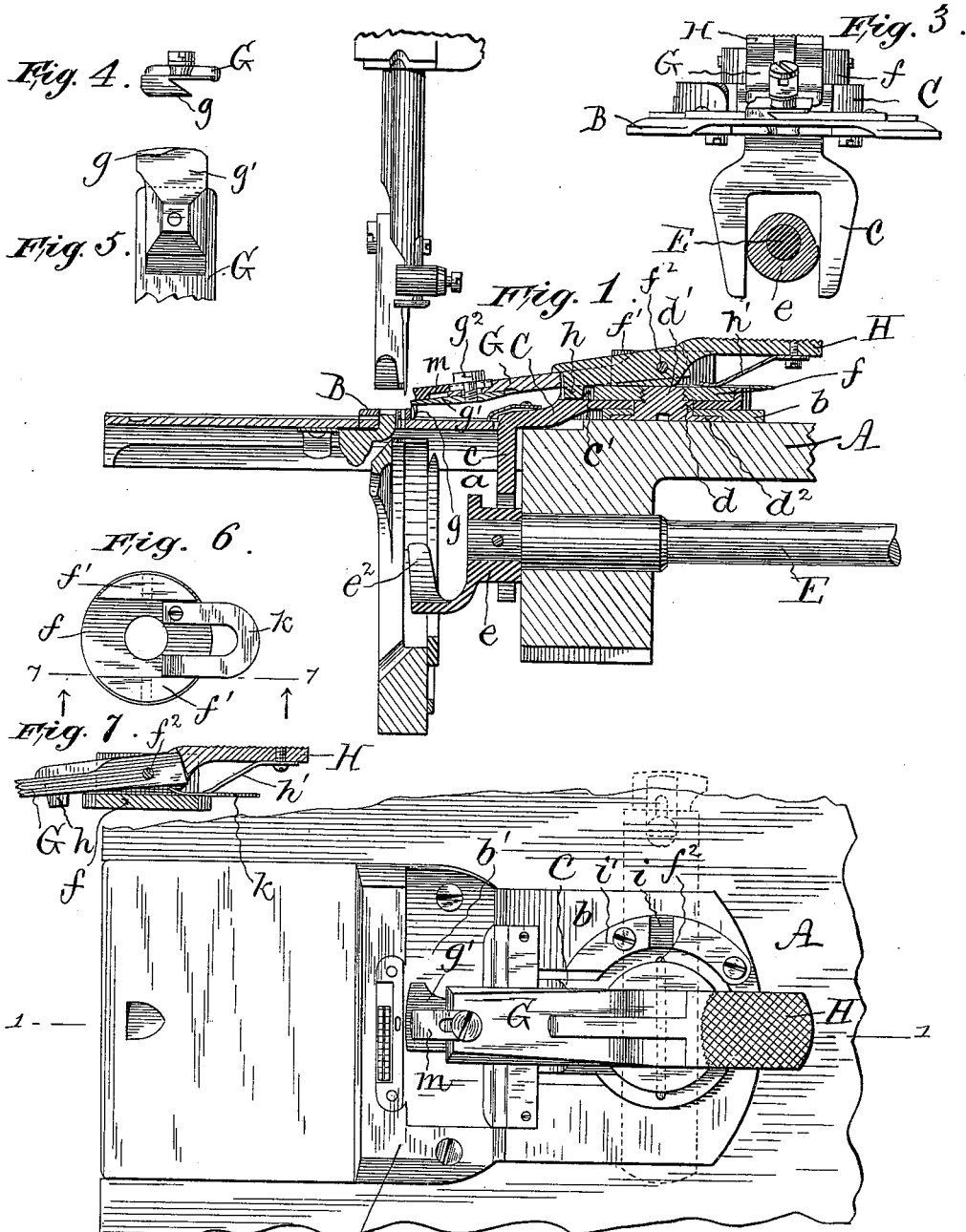

(No Model.) 2 Sheets—Sheet 2.

WITNESSES: INVENTORS:

UNITED STATES PATENT OFFICE.

PHILIP DIEHL AND MARTIN HEMLEB, OF ELIZABETH, NEW JERSEY, ASSIGNORS TO THE SINGER MANUFACTURING COMPANY, OF NEW JERSEY.

SEWING-MACHINE TRIMMER.

SPECIFICATION forming part of Letters Patent No. 619,873, dated February 21, 1899.

Application filed March 11, 1898. Serial No. 673,500. (No model.)

*To all whom it may concern:*

Be it known that we, PHILIP DIEHL and MARTIN HEMLEB, citizens of the United States, residing at Elizabeth, in the county of Union and State of New Jersey, have invented certain new and useful Improvements in Sewing-Machine Trimmers, of which the following is a specification, reference being had therein to the accompanying drawings.

This invention relates to that class of sewing-machine trimmers adapted to trim off the edge of the lower of two pieces of material being sewed together simultaneously with the stitching operation by means of a knife or cutter formed at the end and on the lower side of a suitable shank which may be integral with or suitably secured to a horizontally-swinging lever, the object of the present invention being to provide a simple and effective trimmer of the class referred to adapted for operation in connection with well-known styles of sewing-machines at present in use, with but little change in the construction of such machines.

To this end the improved trimmer comprises an operating-lever pivotally mounted on an extension of the machine throat-plate and provided with a depending yoke embracing a trimmer-operating cam with which the shuttle or loop-taker operating shaft of the machine is provided, a cutter-lever being detachably connected with said operating-lever in such a manner as to reciprocate therewith when the trimmer is in operation, and the detachable connection of said cutter-lever with said operating-lever permitting the cutter-lever to be swung aside out of the way when the machine is to sew without trimming.

Figure 8:
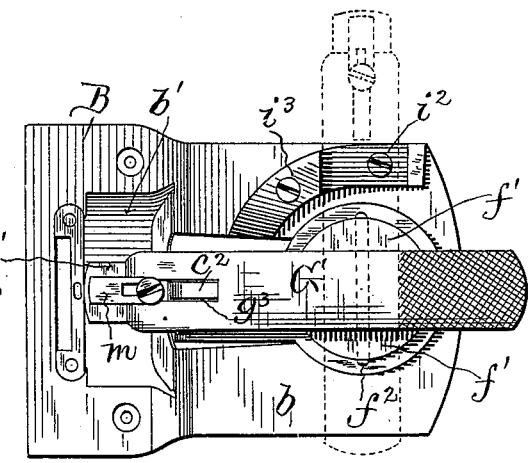
Figure 9:
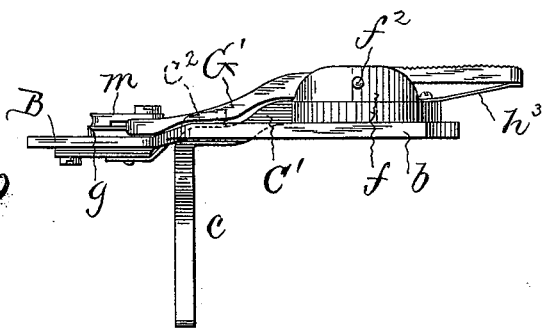

In the accompanying drawings, Figure 1 is a sectional side view of a portion of a Singer oscillating-shuttle sewing-machine with the improved trimmer applied thereto, the section being taken on line 1 1 of Fig. 2. Fig. 2 is a partial plan view of the bed-plate of the same machine with the trimmer in place. Fig. 3 is a front end view of the trimmer with the shuttle-shaft and trimmer-operating cam in section. Fig. 4 is a detail end view of the knife and its carrying-lever, and Fig. 5 is a bottom view of the knife and a part of its carrying-lever. Fig. 6 is a plan view of the turret of the attachment; and Fig. 7, a section of the turret on line 7 7 of Fig. 6, this view showing the locking-lever in section and a part of the cutter-lever in side elevation. Figs. 8 and 9, Sheet 2, are plan and side views, respectively, of a slightly-different form of the invention from that shown on Sheet 1.

A denotes the sewing-machine bed-plate or work-plate, and B a special trimmer throat-plate removably attached by screws $a$ to said bed-plate and provided with an extension $b$, said special throat-plate fitting in the recess in the bed-plate usually occupied by the ordinary throat-plate and said extension-plate serving to support the trimming attachment.

C is an operating-lever pivotally mounted on a boss $d$ of a screw $d'$, said lever having a depending yoke $c$ extending downward through an opening $a$ in the bed-plate and embracing a cam $e$, with which the rocking-shuttle-operating shaft E is provided, said cam being herein shown as being integral with the collar of the shuttle-driver $e^2$. The head $d^2$ of the screw $d'$ is seated in a recess formed for its reception in the under side of the extension $b$ of the throat-plate B, the threaded part of said screw entering a tapped hole in the lower part of a turret $f$, seated in a circular recess in the hub of the lever C, said turret being provided with cheeks $f'$, between which is pivotally mounted on a pin $f^2$ the cutter-lever G, carrying at its forward end the knife or cutter $g$, which is preferably formed on a shank $g'$, attached to said lever by a screw $g^2$. The hole in said lever through which the shank of said screw $g^2$ passes is preferably slightly elongated to permit of a limited endwise adjustment of said shank relative to said lever.

H is a locking-lever pivoted on the pin $f^2$ and provided at its forward end with a lug $h$, normally held in a notch or recess $c'$ in the operating-lever C by a spring $h'$, tending to force the forward end of said locking-lever downward, said locking-lever thus locking the turret $f$ and cutter-lever G to the operating-lever, so that the said cutter-lever and operating-lever will vibrate in unison when the cutter is to work; but when the machine is to sew without trimming the tailpiece of the locking-lever will be pressed upon by the attendant, thereby withdrawing the lug $h$ from its holding-notch $c'$ and permitting the turret to be partially rotated to swing the cutter-lever aside to the position denoted by dotted lines in Fig. 2, when the lug $h$ will drop into a notch $i$ formed in a rib $i'$, with which the throat-plate extension $b$ is provided. When the parts are in this inoperative position, the operating-lever will continue to vibrate idly when the machine is running, but the cutter-lever, turret, and locking-lever will be at rest.

The throat-plate B is provided with a recess $b'$ to receive the cutter and the strip of leather or other material which is severed from the work by the cutter, the latter working against or in close proximity to the front wall of said recess and being timed to perform its cutting movements when the needle is in the work, so that the latter is held immovable while being trimmed. The forward end of the cutter-lever and the cutter attached thereto are held downward by a U-spring $k$, one arm of which presses against the under side of said lever rearward of the pivot-pin $f^2$, the resilience of said spring permitting the cutter-lever and cutter to adapt themselves to varying thicknesses of material.

The cutter-lever is preferably provided with a guide $m$ for the edge of the upper layer of material, said guide being adjustably secured to said lever by the cutter-attaching screw $g^2$.

In the modified form of the invention shown in Figs. 8 and 9 the operating-lever $C'$ is provided on its upper side with a lug $c^2$, entering a recess $g^3$, formed for its reception in the cutter-lever $G'$, the forward end of which latter is pressed down to hold the parts engaged by the spring $h^3$, which will yield when the tailpiece of said lever $G'$ is pressed upon to disengage the said levers, and the lever $G'$ may then be swung aside, as denoted by dotted lines in Fig. 8, until it rests in the notch $i^2$ of the rib $i^3$ on the throat-plate extension $b$ when the machine is to sew without trimming.

From the foregoing it will be apparent that in order to change a well-known type of sewing-machine as now constructed to a sewing and trimming machine it is only necessary to add a cam to the shuttle-operating shaft and to substitute the modified or extended throat-plate, with the trimmer attachment thereon, for the ordinary throat-plate.

Having thus described our invention, we claim and desire to secure by Letters Patent—

1. A sewing-machine trimming attachment comprising the combination with a supporting-plate adapted to be removably attached to the work-plate of the machine, of an operating-lever pivotally mounted on said supporting-plate and provided with a depending yoke, a horizontally-swinging cutter-carrying lever also pivotally mounted on said plate, and means for detachably connecting said levers so that the cutter-lever may be swung aside when not in use.

2. A sewing-machine trimming attachment comprising the combination with a supporting-plate, of an operating-lever pivotally mounted thereon and provided with a depending yoke, a horizontally-swinging cutter-carrying lever, a pivoted turret in which said cutter-carrying lever is mounted, and means for detachably connecting said turret and cutter-carrying lever with said operating-lever so that they will all swing in unison, but permitting the cutter-carrying lever and turret to be turned aside when the cutter is to be thrown out of operation.

3. A sewing-machine trimming attachment comprising the combination with a supporting-plate, of an operating-lever pivotally mounted thereon and provided with a depending yoke, a horizontally-swinging cutter-carrying lever, and a spring-pressed locking-lever serving to detachably connect the said cutter-carrying lever with said operating-lever, but permitting said levers to be disengaged from each other so that the cutter-carrying lever may be swung aside when not wanted for use.

4. In a sewing and trimming machine, the combination with a rotary or oscillatory shaft located beneath the work-plate of the machine and provided with a cam, of a trimming attachment comprising a supporting-plate located above said work-plate, an operating-lever also above said work-plate and provided with a depending yoke embracing said cam, a cutter-carrying lever, and means for detachably connecting said levers so that the cutter-lever may be operated when desired, but may be swung aside when not in use.

5. The combination with the work-plate A, of the shaft E provided with a cam $e$, the supporting-plate B located above said work-plate, the operating-lever C also above said work-plate and having the depending yoke $c$ embracing said cam, the cutter-lever G provided with the cutter $g$, and means for detachably connecting said cutter-lever and said operating-lever, so that the former will be actuated by the latter when desired, but may be detached from said operating-lever and swung aside when not in use.

6. The combination with the shaft E provided with the cam $e$, of the operating-lever C having the depending yoke $c$ embracing said cam, the turret $f$, a cutter-lever pivoted in said turret and provided at its forward end with the knife or cutter $g$, and means for detachably connecting said cutter-lever with said operating-lever.

7. The combination with the shaft E provided with the cam $e$, of the operating-lever C having the depending yoke $c$ embracing said cam, the turret $f$, the cutter-lever G pivoted in said turret and provided at its forward end with the knife or cutter $g$, and the spring-pressed locking-lever H pivoted in said turret and serving to connect said cutter-lever and turret with said operating-lever, so that these parts will all move in unison.

8. A trimming attachment for sewing-machines comprising the combination with a supporting-plate, as $b$, of an operating-lever C pivotally mounted on said plate and provided with a depending yoke $c$, the turret $f$, the cutter-lever G pivotally mounted in said turret and provided at its forward end with the knife or cutter $g$, the U-spring $k$ one arm of which bears upon the under side of said cutter-lever rearwardly of its pivot to press the forward end of said lever yieldingly downward, the locking-lever H also pivotally mounted in said turret and having a lug $h$ at its forward end, and the spring $h'$ serving to hold said lug in engagement with the said operating-lever, but permitting the said locking-lever to be disengaged from the said operating-lever when the cutter-lever is to be swung aside.

In testimony whereof we affix our signatures in the presence of two witnesses.

PHILIP DIEHL.
MARTIN HEMLEB.

Witnesses:
HENRY J. MILLER,
HAROLD W. BROWN.